No. 887,890. PATENTED MAY 19, 1908.
G. V. VALENTINE.
INSTRUMENT FOR DRAFTING GARMENT PATTERNS.
APPLICATION FILED DEC. 6, 1906.
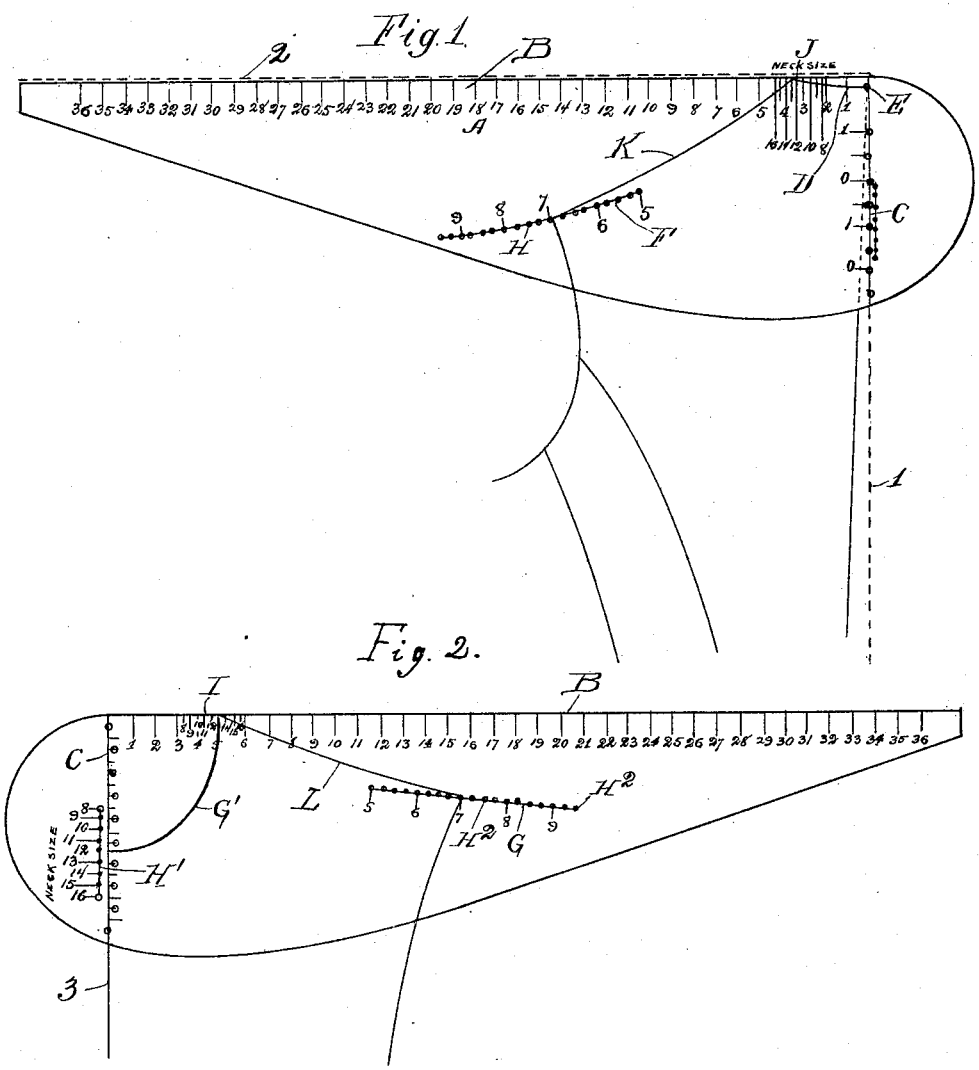

UNITED STATES PATENT OFFICE.

GUSTAF V. VALENTINE, OF CHICAGO, ILLINOIS.

INSTRUMENT FOR DRAFTING GARMENT-PATTERNS.

No. 887,890.           Specification of Letters Patent.        Patented May 19, 1908.

Application filed December 6, 1906. Serial No. 346,596.

*To all whom it may concern:*

Be it known that I, GUSTAF V. VALENTINE, citizen of the United States, residing at Chicago, in the county of Cook and State of Illinois, have invented certain new and useful Improvements in Instruments for Drafting Garment-Patterns; and I do hereby declare the following to be a full, clear, and exact description of the invention, such as will enable others skilled in the art to which it appertains to make and use the same.

My invention relates to a novel construction in an instrument adapted for use in drafting patterns for ladies' garments, the object being to provide an instrument by means of which patterns may be drafted without the aid of mathematical calculations on the part of the operator and which is easily comprehended and applied, and consists in the features of construction hereinafter fully described and claimed.

In the accompanying drawings illustrating my invention: Figures 1 and 2 are views in elevation of opposite sides respectively of an instrument constructed in accordance with my invention, certain graduated scales and printed matter appearing thereon being omitted from illustration as forming no part of my present invention, said instrument being shown in positions on fragmentary drafts of the rear and front of a body garment respectively.

My present invention relates to an improvement upon the device forming subject of Letters Patent No. 708506, granted to me Sept. 2, 1902, and the improvement relates specifically to the means provided for accurately drafting the shoulder portion of a garment. As the said improvement affects only that portion of the patented instrument relating to the location on the draft of the points necessary to accurately draw the shoulder seam lines, I omit from illustration and description all matter not directly necessary to a full comprehension of my present improvement. My said instrument is necessarily dependent upon a definite system of taking the measurements of the person to be fitted and to properly apply this instrument it is necessary that measurement be taken from the intersection of the neck-seam with the middle back seam (or corresponding point) to that point in the shoulder which happens to determine the then fashionable width thereof in the garment. This measurement is accordingly taken either beyond or inwardly of the point of the shoulder.

The instrument A is provided with a straight edge which on each side of the instrument is to form the graduated scale B the main divisions of which are disposed at intervals of a half inch each and successively numbered from "1" to "36" beginning at the larger curved end of the instrument. Disposed at right angles to said graduated scale B and intersecting the latter at its starting point is a graduated scale C, the latter also appearing on both sides of the instrument.

A curved line D (Fig. 1) appears on one side of the instrument extending from a given point on the scale C to a given point on the scale J hereinafter described, said line indicating approximately the neck-line of the back of the body-garment such as a waist or the like. At the intersection of the said line D with the scale C, is a perforation E indicating the juncture of the neck and middle back seams, the said scale C being the equivalent on the instrument of the middle back seam and constituting the main line from which all measurements are taken.

On the body of the instrument on opposite sides thereof are two graduated scales F and G, the graduations of which consist of a series of perforations H and $H^2$ respectively. The former of said scales has its graduations numbered in accordance with their respective distances from the perforation E, the said numbers of said graduations representing the distance in inches from the intersection of the neck and middle back seams to the shoulder point. The other graduated scale G has its graduations numbered in accordance with their respective distances from a point on the straight edge determined by the neck measurement of the person to be fitted, (said point being located somewhere in the small graduated scale I on the straight edge) and the numbers thereof also representing the measurement in inches from the intersection of the neck and middle back seams to the shoulder point.

It will be noted that adjacent the larger end of the instrument there appears a curved line D intersecting the scales $B^1$ and C and an additional graduated scale H, (Fig. 2) adjacent the scale C.

The scales I and $H^1$ are used in drafting the neck and shoulder seam lines of the front of the garment, the scale I being used to determine the point of intersection of the neck and shoulder seams and the position of the shoulder seam being determined by drawing a line from the last-named point to that point in the scale G corresponding in its ordinal with the number of inches representing the distance between the shoulder point and the intersection of the neck and middle back seams. The said scales H¹ and I are also so positioned as to determine the proper angle of inclination of the shoulder seam line on the draft, such positions of said scales having been fixed by careful calculation and experiment as have also the graduations thereof.

My said instrument is applied as follows: Primarily "base line 1" (Fig. 1) is drawn on the pattern sheet or draft and the instrument then laid thereon so that the line of graduated scale C registers therewith and "base line 2" then drawn by causing the pencil to follow the straight edge of the instrument to the point in the scale B conforming to the measurement in inches of the bust of the person to be fitted. The point of the pencil is then inserted through the perforation E and then through the perforation in the scale F numbered to correspond with the number of inches representing the distance from the point of the shoulder to the intersection of the neck and middle-back seams.

On the straight edge of the instrument is a small graduated scale J (Fig. 1) termed neck size, the graduations of which are relatively closely spaced and numbered consecutively, the said numbers representing in inches the neck circumference. On this scale on the base line 2 a point is marked opposite the graduation corresponding to the neck circumference. The instrument is then removed and a curved line drawn connecting the last-named point with the point fixed by passing the pencil point through the perforation in the scale F, said line being indicated by the line "K" on the instrument. A curved line is then drawn from the previously determined point on base line 2 to the point determined by passing the pencil through the perforation E corresponding substantially to the line D on the instrument. The shoulder and neck seam lines for the back of the garment are thus fixed. The instrument is now inverted, the straight edge thereof being disposed flush with base line 2 and the scale C registering with the end of said base line. The neck circumference is then marked on base line 2, scale I, and the pencil point passed through the perforation in scale G corresponding numerically with the measurement in inches of the distance from intersection of middle back and neck seams. The instrument is then removed and a curved line corresponding to the line L appearing on the instrument is then drawn. On the draft base line 3 is drawn parallel with base line 1 and joining base line 2 at its end. Base line 3 indicates the middle front of the garment. When the draft has been completed in all details, it will be found that the curved lines K and L will correspond in length and their respective positions as to inclination with relation to base lines 1, 2 and 3 will be such that when the drafts of the back and front of the garment are opposed the shoulder seams will register.

I claim as my invention:

1. An instrument of the kind specified having a straight edge and having printed thereon a line perpendicular to said straight edge and representing the middle back seam and middle front of the garment, graduated scales on opposite sides of said instrument in the body portion thereof inclined to said straight edge and said perpendicular line and in which the outer end of the shoulder seam is fixed on the draft, one of said last-named scales having its beginning at a given point in said perpendicular line, a graduated scale on said straight edge adjacent one end thereof for determining the point of intersection of the neck and shoulder seams of the front of the garment, one of said graduated scales for fixing the point of termination of the shoulder seam on the draft having its beginning at the point in the last-named graduated scale corresponding numerically in inches with the neck-size of the person to be fitted, the graduations of said shoulder seam scales being numbered consecutively to correspond with the measurement in inches of the distance between the point of the shoulder and the point on the body corresponding to the intersection of the point of neck and middle back seams of the person to be fitted.

2. An instrument of the kind specified having a straight edge and having printed thereon a line disposed perpendicular to said straight edge, said last-named line representing the middle line of the back of the wearer and constituting the main base from which measurements are taken and fixed on the draft, graduated neck-size scales disposed on the straight edge and starting at said perpendicular line, one of said neck-size scales beginning at a given point in said line representing the upper end of the middle back seam of the body garment, an inclined graduated scale in the body of the instrument having its beginning at the last-named point in said perpendicular line and having its graduations consecutively numbered to correspond with measurements in inches from the corresponding point on the body to the point of the shoulder and serving to fix the point of termination of the outer end of the shoulder seam on the draft of the back of the body garment the point of intersection of said shoulder seam with the neck-seam being fixed on said last-named neck size scale, and the shoulder seam line being fixed on the draft by a line connecting said points, a second inclined graduated scale on the body of the garment on which the termination of the shoulder seam is determined in connection with a traveling point in the other neck-size scale determined by the measurement in inches of the neck of the person to be fitted and serving to fix on the draft the shoulder seam line of the front of the body garment, substantially as described.

In testimony whereof I have signed my name in presence of two subscribing witnesses.

GUSTAF V. VALENTINE.

Witnesses:
 RUDOLPH WM. LOTZ,
 ARTHUR A. LOTZ.